United States Patent Office 3,370,459
Patented Feb. 27, 1968

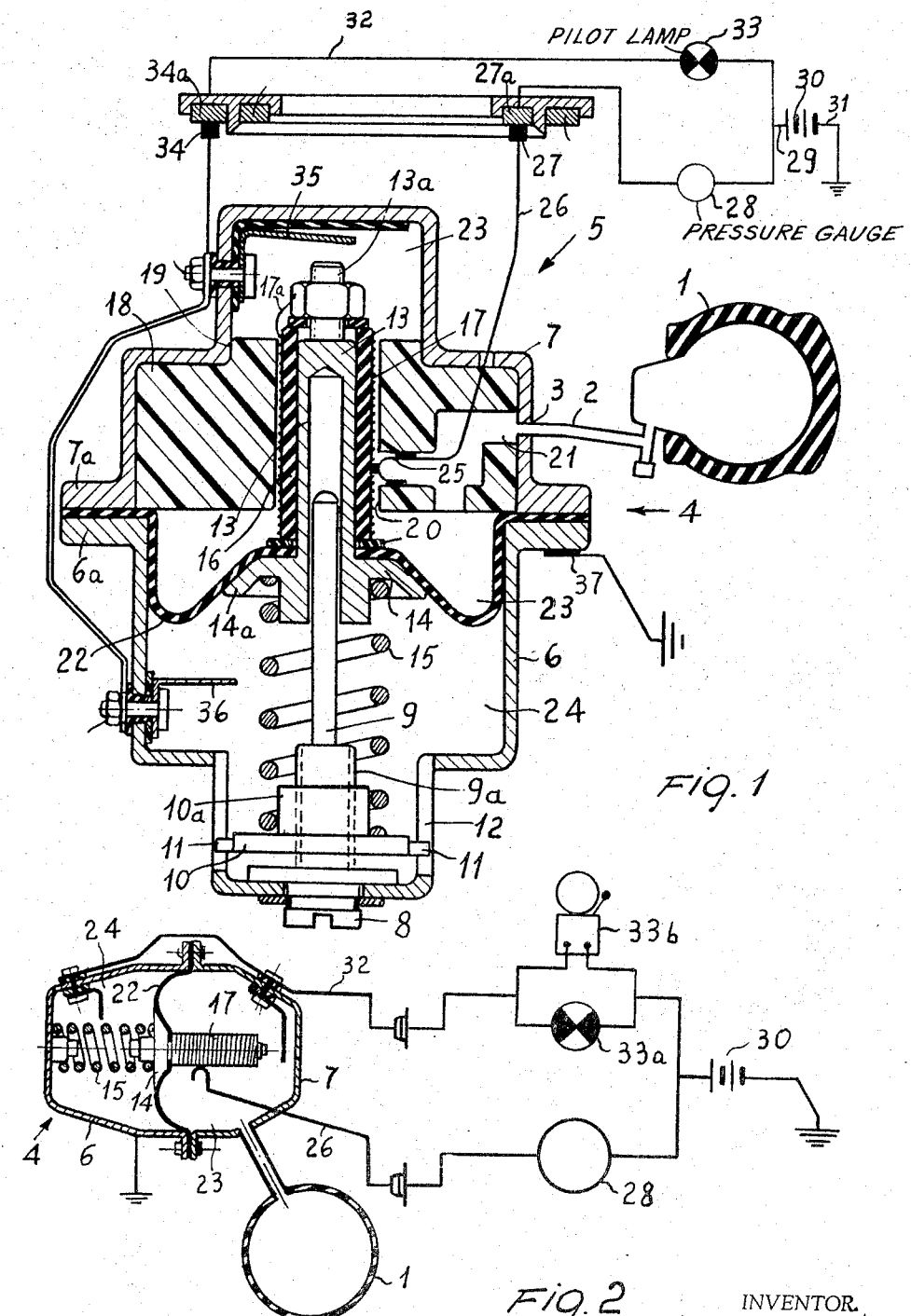

3,370,459
DEVICE FOR DETECTING PRESSURE EXISTING
IN PNEUMATIC TIRES
Arturo Cescati, Via Parenzo 2, Rovigo, Italy
Filed Apr. 12, 1965, Ser. No. 447,428
Claims priority, application Italy, Apr. 16, 1964,
8,725/64, Patent 720,913
1 Claim. (Cl. 73—146.5)

ABSTRACT OF THE DISCLOSURE

This invention relates to a device for detecting pressure existing in a pneumatic tire, comprising a casing which is divided by a diaphragm member into sealed compartments, one of which communicates with the interior of the tire and the other with the outside atmosphere. The diaphragm is connected with a longitudinally guided elongated member carrying a coil of conducive tire. The elongated member is urged in one end position thereof by a spring and is urged by the pressure existing in the compartment communicating with the tire in an opposite direction. Contact means are provided in slidable connection with the said coil and near one end position of the elongated member, so that an electric circuit is closed when the elongated member is in the end position thereof. The device is fixed on the hub of the wheel of the tire and is in rigid rotary relation therewith. Annular sliding contacts are foreseen between the stationary part of the signalling circuit and the rotating portion thereof. The device is arranged to signal deflation.

---

The present invention relates to a pneumatically operated automatic device, particularly but not exclusively for electrically signaling the values of pressure existing in pneumatic tires of motor vehicles.

It is the main object of the present invention to provide a device enabling the driver of a motor car for example to know the pressure value prevailing in the pneumatic tires also during the motor car run.

A further object of this invention is to provide a device adapted to ensure an immediate signaling that predetermined pressure limit values have been reached in the pneumatic tires under the car.

It is still another object of this invention to provide for such a device a safe performance and easy execution.

A further object of this invention is to provide a device which on account of its small overall dimensions is easily applicable to the wheels of al motor car types which are today commercialy available.

These and still other objects, which will become more apparent from the following detailed description are attained according to the invention by a pneumatically operated automatic device, particularly for electrically signaling the values of pressure existing in pneumatic tires of motor vehicles, comprising a rheostat element the position of which depends on the pressure values existing inside the pneumatic tire, an electrical circuit connected with said rheostat element and comprising signaling instruments responsive to the current passage in said circuit, the intensity of said current depending on the said rheostat element position.

Advantageously the device comprises an outer casing, a flexible diaphragm disposed transversally inside said outer casing and defining a first space in communication with the inside of a pneumatic tire, and a second space in communication with the outside of said casing, a sliding member of electrically conducting material longitudinally extending relative to said casing from the first to the second of said spaces through said flexible diaphragm and fastened tight to the latter, spring means with adjustable tension provided in said second space and resting on one side upon a wall of said outer casing and on the other side upon said sliding member, two electric contact members fastened on said casing and arranged on the run of said sliding member, a direct current source, electric circuit means connected to said electric and ground contact means, an electric resistance spiral-supported on a member consisting of insulating material provided on said sliding member, a contact means sliding with said electric resistance and interlocked with signaling means, connected to said circuit means.

Further characteristic features and advantages will become more apparent from the following detailed description of two preferred but non-limiting embodiments of the invention when taken in conjunction with the accompanying drawing, in which:

FIG. 1 is a section along a diametral plane of a device according to the present invention and diagrammatically illustrating further the supply electric circuit of the device; and FIG. 2 is a section similar to FIG. 1 showing another embodiment of the device according to the present invention.

Referring now to FIGURE 1, the reference number 1 indicates the cross section of a tire in respect of which it is required to ascertain variations, if any, of internal pressure. The inside of the tire 1 is connected to the pipe 2 which enter the outer casing 4 of the automatic signaling device 5 according to the invention. Device 5 is contained in the outer casing 4 which has a capsule shape and is fastened in a suitable position on the wheel hub and turns consequently together with the pneumatic tire.

The casing 4 consists of the caps 6 and 7 which carry at their opened and facing ends two outer flanges 6a and 7a respectively which serve for the closing of the casing for example by means of nuts and bolts. An adjusting screw 8 the head of which passes through the bottom of the cap is engaged with the latter in such a way as not to undergo axial displacements.

Such adjusting screw 8 is provided with a shank 9 which has a first threaded section 9a adjacent the head having a greater cross section than the remainder of the shank. On the section 9a a plate 10 is screwed having a threaded sleeve 10a. Such plate 10 is prevented from rotating by one or more stopping means 11, sliding inside suitable longitudinal grooves 12 formed on the cap 6.

It is, therefore, manifest that to each eventual rotation of the screw 8 an axial displacement will correspond in one direction or the other of the plate 10.

On the free end of the shank 9 a hollow member 13 is slidably supported, which at the end nearest to the cap 6 has a flange 14, which is substantially shaped like an annular cap with outwardly countersunk edge 14a, while at the opposite end it terminates with a threaded appendix 13a.

A helicoidal spring 15, external to the sleeve 10a rests with one extremity upon the plate 10 and with the other extremity upon the flange 14 of the member 13. The spring 15 tends, therefore, to move plate 10 and members 13 away from each other, its force being adjustable by screwing the screw 8 in one direction or in the other.

Outwardly the hollow member 13 is fitted with a sleeve 16 consisting of insulating material on which is spiral-wound an ohmic resistance 17, having a free terminal and a terminal 17a connected to the appendix 13a.

A cylindrical body member 18, consisting of insulating material and having an outside diameter equal to the inside diameter of the cap 7, is provided in the cap 7.

The body member 18 has a cylindrical stepwise narrowing 19 abutting into the corresponding step provided in the cap 7. The cylindrical body member 18 is axially provided with a through-hole 20 in which the ohmic resistance 17 is placed. The cylindrical body member 18 has further a set of hollow spaces 21 which put into intercommmunication the inside of tire 1 and the cap 7.

The assembling of caps 6 and 7 of the casing is effected by joining the flanged edges 6a and 7a after the peripheral edge of a flexible and slack diaphragm 22 has been positioned therebetween. Said flexible and slack diaphragm 22 extends transversely of the casing 4 and defines a first space 23 substantially surrounded by cap 6 and a second space surrounded by cap 7. The diaphragm 22 is crossed and tightened to the hollow member 13 by known clamping means at its central portion.

A sliding contact element 25, housed inside the body member 18, is in contact with the resistance 17 and connected by means of an insulated cable 26 to the rotary portion of a second sliding contact 27. The stationary portion 27a of the sliding contact 27 is in turn connected through a pressure gauge 28 to a pole 29 of the direct current generator 30.

The other pole 31 of the generator 30 is connected to the ground.

From the pole 29 a second cable 32 is derived, which is connected in series to a pilot lamp 33 and through the sliding contact 34 to two insulated contact elements 35, 36 for overload and no-load pressure values, respectively provided on the caps 6 and 7.

The casing 4 is connected to the ground at 37 and thus in particular will be grounded by the hollow member 13, through the screw 8 and the terminal 17a of the resistance 17.

Referring now to FIGURE 2, there is shown a further embodiment of the invention and the same parts are indicated by the same reference numbers.

An electro-acoustic signaling instrument is shown at 33b which is connected in parallel with the pilot lamp 33a.

The operation of the device according to the invention is as follows:

At each variation of pressure in the inside of the pneumatic tire 1 there will be an equal variation of pressure in chamber 24, which is airtight with respect to the outer ambient. The diaphragm 22 spreads out or folds over depending upon an occurring increase or decrease in tire pressure and ensures the axial sliding of the hollow element 13 against the action of the spring 15. Consequently, there will be longitudinal displacement of the ohmic resistance 17 in relation to the contact element 25. Thus in the indicating circuit a current variation corresponding to the current intensity variation will be measured.

In a closely analogous manner, when for example pressure in the inside of pneumatic tire 1, and hence in the chamber 24 exceeds a determined value, the expansion of the diaphragm 22 ensures axial sliding of the hollow member against the action of the spring 15 until the edge 14a (connected to the ground) of the flange of the element 13 touches the tongue contact member 36 (overload contact means) thus closing the alarm signaling circuit via the sliding contact 34 and the instrument 33.

In the practical embodiment of the invention one such device will be applied to each of the pneumatic tires on the motor car. By way of example some possible embodiment combinations are provided hereinbelow in the case of four pneumatic tire motor cars.

In a first combination four pressure gauges (one per pneumatic tire) or one pressure gauge only can be provided, connectable by means of suitable switch to the four sliding contacts of the indicating circuits, and one alarm indicator only interlocked with the sliding contacts of the alarm circuits.

In the case of the four pressure gauges, the reading of the pressure values in each one of the four pneumatic tires will be taken directly, and in the case of alarm indication, it will be possible to directly know which of the four pneumatic tires has a pressure higher or lower than a pre-determined limit. In the case of one pressure gauge only with communication by separate parallel switches to all four indicating circuits, the reading of pressure values in the individual pneumatic tires will be taken by suitably acting on the switch itself, as it will be in the case of alarm indication, the driver will be allowed by shifting the switch contacts to check out which of the pneumatic tires has reached a pressure limit value.

In a second combination there are provided four indicating circuits connectable either to a corresponding number of individual pressure gauges or to one common gauge only, through a switch.

Finally four alarm indicating circuits can be interlocked with a corresponding number of separate indicators, that is one per pneumatic tire. In this case the alarm indicating circuit will be working whenever inside one of the pneumatic tires a determined upper or lower limit value of pressure has been reached, without, however, knowing which of the two values has been reached. Desiring, therefore, to have an instantaneous possibility to know the pressure value reached, the two overload and no-load contacts of each capsule should be interlocked with two distinct electric circuits (and not shunted as in the exemplification given), and the individual contacts should be provided with corresponding alarm indicators. In the case of four pneumatic tires, therefore, there will be eight alarm indicators four of which will be overload and the remaining four no-load indicators.

The present invention is subject to several changes and modifications without however departing from the scope of the invention as defined in the appended claims.

So for example the joining of the two caps can be obtained by screwing a flange onto the other; both alarm indicating circuit and pressure indicating circuit can be supplied by two separate current sources; the shape of the caps may vary, as well as the shape and arrangement of overload and no-load contacts; the variable resistance may be replaced with movable husk or with a condenser having a plate fast with the diaphragm, in these cases an instrument adapted to indicate directly or indirectly variations of inductance or capacity being provided on the indicating circuit.

I claim:

1. In a device for detecting pressure existing in a pneumatic tire of a wheel having a hub and an axis of rotation, the combination comprising an outer casing fixed on the hub and parallel to said axis of rotation and consisting of two opposite cap elements connected to each other at the periphery of the open ends thereof and defining the inside of said casing, a transverse flexible and slack diaphragm peripherically clamped between said cap elements and defining a first and a second space inside said casing, said first space communicating with the inside of the pneumatic tire and said second space communicating with the outside of said casing, a spring means with adjustable tension parallel to said axis of rotation and arranged within said second space resting on one side upon a wall of said casing and on the other side upon said diaphragm, a coil consisting of an ohmic resistance parallel to said axis of rotation and movably mounted in said first space and secured to one end thereof to said diaphragm, the outer diameter of resistance coil being less than the inner diameter of said first space, supporting means in said casing for said ohmic resistance, a sliding contact element fixed on said casing and engaging the outer side of said movable resistance coil, a D.C. current source, an electric circuit connecting said source to said sliding contact and one end of said coil, and a signalling means in said electric circuit responsive to the current variation in said circuit.

References Cited

UNITED STATES PATENTS

| | | | |
|---|---|---|---|
| 2,071,256 | 2/1937 | Dobbs | 340—58 |
| 2,248,047 | 7/1941 | Addy et al. | 338—37 X |

JOHN W. CALDWELL, *Primary Examiner.*

NEIL C. READ, *Examiner.*

A. H. WARING, *Assistant Examiner.*